(12) United States Patent
Chen

(10) Patent No.: US 7,648,043 B2
(45) Date of Patent: Jan. 19, 2010

(54) WATERPROOF COVER WITH A WATER BLOCKING FLANGE FOR AN AUDIO SYSTEM

(76) Inventor: Kuan-Wei Chen, 1F, No. 19-1, Lane 39, Sec. 2, Jianguo S. Rd., Taipei (TW)

( * ) Notice: Subject to any disclaimer, the term of this patent is extended or adjusted under 35 U.S.C. 154(b) by 635 days.

(21) Appl. No.: 11/422,073

(22) Filed: Jun. 3, 2006

(65) Prior Publication Data

US 2007/0277993 A1    Dec. 6, 2007

(51) Int. Cl.
*B65D 43/14* (2006.01)
*B65D 51/18* (2006.01)
*H02G 3/14* (2006.01)

(52) U.S. Cl. .............. 220/825; 220/263; 220/254.3; 174/66

(58) Field of Classification Search ........... 220/263, 220/825, 351, 252, 254.3, 254.4; 174/66; 312/7.1
See application file for complete search history.

(56) References Cited

U.S. PATENT DOCUMENTS 4,381,063 A    4/1983 Leong 6,919,510 B1    7/2005 Chen
6,921,141 B1    7/2005 Porco
7,375,279 B2 *    5/2008 Chen .................. 174/66

OTHER PUBLICATIONS

U.S. Appl. No. 11/179,513, Kuan-Wei Chen.
Kuan-Wei Chen, pending unpublished U.S. Appl. No. 11/179,513, filed Jul. 13, 2005, titled "Waterproof Cover for an Audio System".

* cited by examiner

*Primary Examiner*—Robin Hylton
(74) *Attorney, Agent, or Firm*—Pai Patent & Trademark Law Firm; Chao-Chang David Pai

(57) ABSTRACT

A waterproof cover for an audio system includes a frame and a shield pivotally connected to the frame. The flame has two elongated recesses respectively defined in two opposed sides defining the through hole and an inclined trough sandwiched by the two elongated recesses and defined in a bottom side defining the through hole. The shield has two rails formed on two opposed sides thereof to correspond to and be movably received in the two elongated recesses, a water blocking flange sandwiched by the two rails and formed on a bottom side of the shield to correspond to and be received in the inclined trough and a flange formed on a top side of the shield to abut a top side defining the through hole such that a full coverage of the through hole by the shield is completed and water seeping from engagement between the shield and the frame is reduced.

5 Claims, 5 Drawing Sheets

WATERPROOF COVER WITH A WATER BLOCKING FLANGE FOR AN AUDIO SYSTEM

BACKGROUND OF THE INVENTION

1. Field of the Invention

The present invention relates to a waterproof cover, and more particularly to a waterproof cover for protecting an audio system from water.

2. Description of Related Art

In outdoor activities, an audio system including items such as a loudspeaker, a CD player or a radio for reproducing music is a requirement. However, the audio system will often be affected by water in some situations such as boats, leisure spas etc. Therefore, the audio system is generally provided with a waterproof cover mounted in front of a control panel.

A conventional waterproof cover has an inner gasket, a frame, an outer gasket, and a shield.

The inner gasket is mounted at a first side of the frame and has a first opening defined therethrough. The frame has a second opening defined therethrough and corresponding to the first opening.

The outer gasket is mounted at a second side of the frame. The shield has a tongue protruded from a rear side thereof. Two lugs are formed at two ends of the tongue and positioned in the apertures respectively. Therefore, the shield is pivotally mounted on the frame.

In use, the waterproof cover is installed in front of the control panel of the audio system. Blocked by the inner gasket and the outer gasket, water cannot dampen the control panel, and the audio system is protected.

However, limited by the manufacturing technology, the shield, the outer gasket and the frame can not be tightly assembled together and gaps exist between the shield and the outer gasket, and between the outer gasket and the frame, so water can penetrate the gaps and the audio system may be seriously damaged by the water.

Therefore, the invention provides a waterproof cover to mitigate the aforementioned problems.

SUMMARY OF THE INVENTION

The main objective of the present invention is to provide a waterproof cover for an audio system, which has a good waterproof effect to completely prevent water from seeping into the audio system.

In order to accomplish the aforementioned objective, the waterproof cover of the present invention includes a shield and a frame pivotal relative to the shield. The frame has a through hole defined through the frame, two elongated recesses respectively defined in two opposed sides defining the through hole and an inclined trough defined in a bottom side defining the through hole. The shield has two rails respectively formed on two opposed sides of the shield to correspond to and be received in the two elongated recesses, a water blocking flange formed on a bottom side of the shield to correspond to and be received in the inclined trough of the frame, a flange formed on a top side of the shield to abut a top periphery of the frame and two wings respectively formed on two opposed sides of the flange so that when the flange is abutting the top periphery of the frame, the two wings are able to engage with two opposed sides of the top periphery of the frame to completely block moisture or liquid from seeping through the shield.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
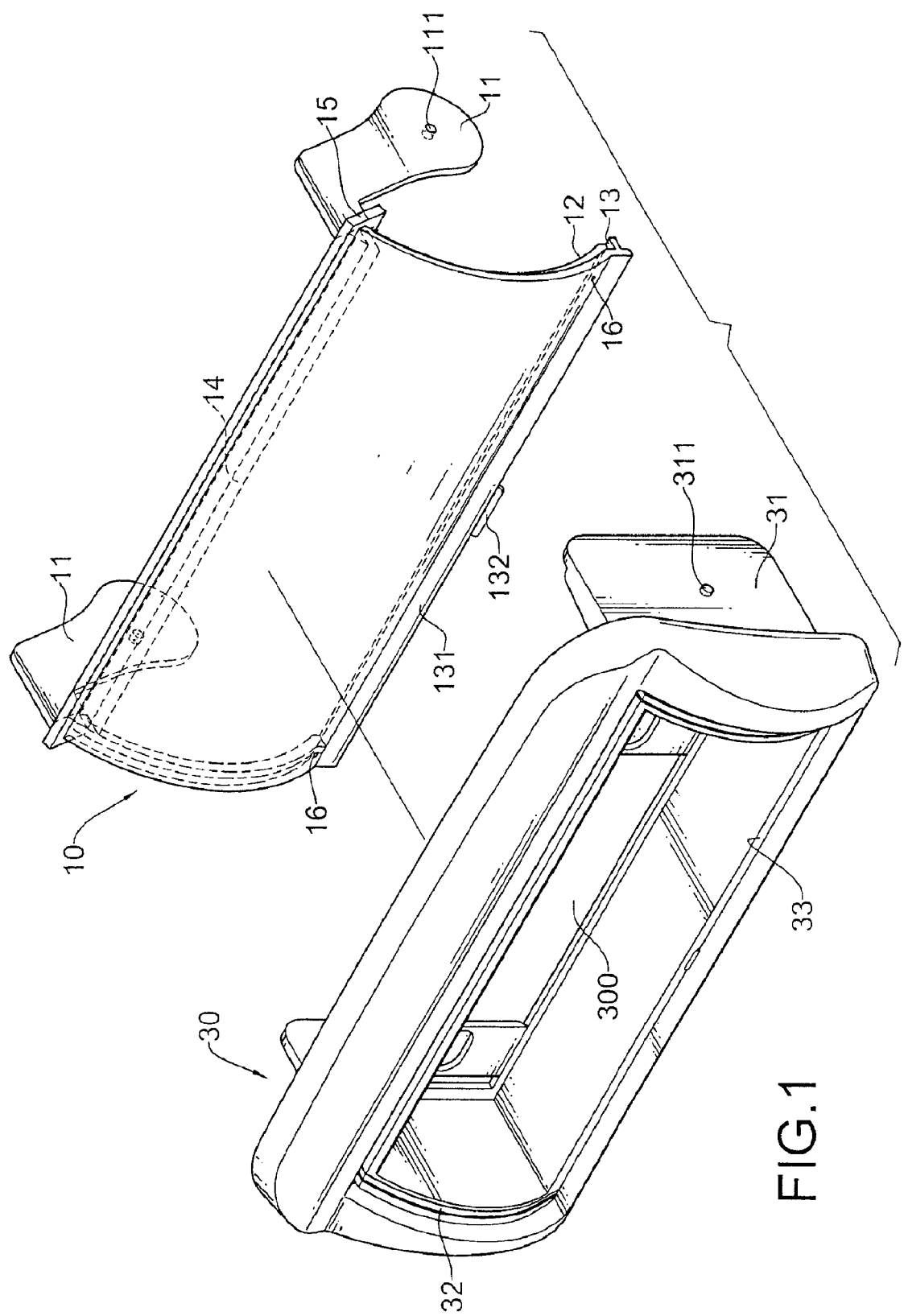
FIG. 1 is an exploded perspective view of a waterproof cover for an audio system in accordance with the present invention.

With reference to FIG. 1, a waterproof cover in accordance with the present invention is composed of a shield (10) and a frame (30) pivotally connected to the shield (10).

The frame (30) has a through hole (300) defined through the frame (30), two legs (31) extending from a side thereof to allow the frame (30) to be located at an appropriate location and each leg (31) having a block (311) formed on an outer surface thereof, two elongated recesses (32) respectively defined in two opposed sides adjacent to the through hole (300) and an inclined trough (33) defined in a bottom side adjacent to the through hole (300). The shield (10) is arcuate in shape and has two extensions (11) oppositely extending out of the shield (10) and respectively having holes (111) defined in a side of the extension (11) to correspond to the blocks (311) of the two legs (31). The shield (10) further has two rails (12) formed on two opposed sides thereof to correspond to and be received in the two elongated recesses (32), a water blocking flange (13) formed on the rear surface of a bottom side of the shield (10) and protruding backwards towards the frame (30) to be sandwiched by the two rails (12) to correspond to and be received in the inclined trough (33) of the frame (30), an outer flange (131) formed adjacent to the water blocking flange (13) to correspond to and abutted to a bottom periphery defining the inclined trough (33), a flange (14) formed on the rear surface of a top side of the shield (10) and protruding backwards towards the frame (30) to abut a top periphery of the frame (30) and two wings (15) respectively formed on two opposed sides of the flange (14) so that when the flange (14) is abutting the top periphery of the frame (30), the two wings (15) are able to engage with two opposed sides of the top periphery of the frame (30) to completely block moisture or liquid from seeping through the shield (10).

Figure 2:
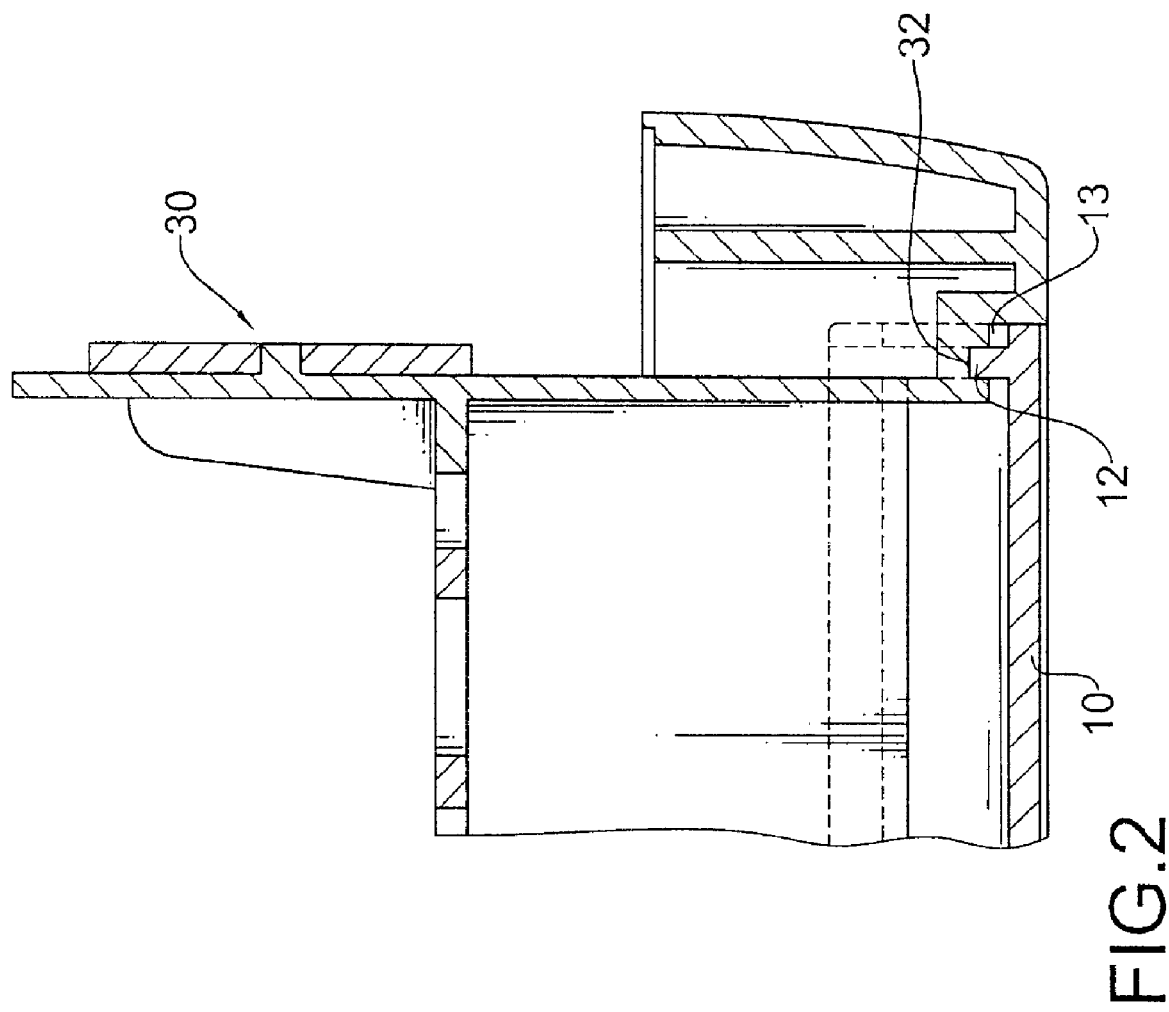
FIG. 2 is a partially cross sectional view showing the relationship between the shield and the frame after the shield is mounted on the frame.

With reference to FIG. 2, it is noted that after the shield (10) is mounted on the frame (30) via the engagement between the blocks (311) and the holes (111), the rail(s) (12) is received in the corresponding elongated recesses (32) such that the shield (10) is able to close and open the through hole (300) of the frame (30) via pivotal movement relative to the frame (30). Furthermore, the water blocking flange (13) is received in the inclined trough (33) with the outer flange (131) abutted against the bottom periphery defining the inclined trough (33).

Figure 3:
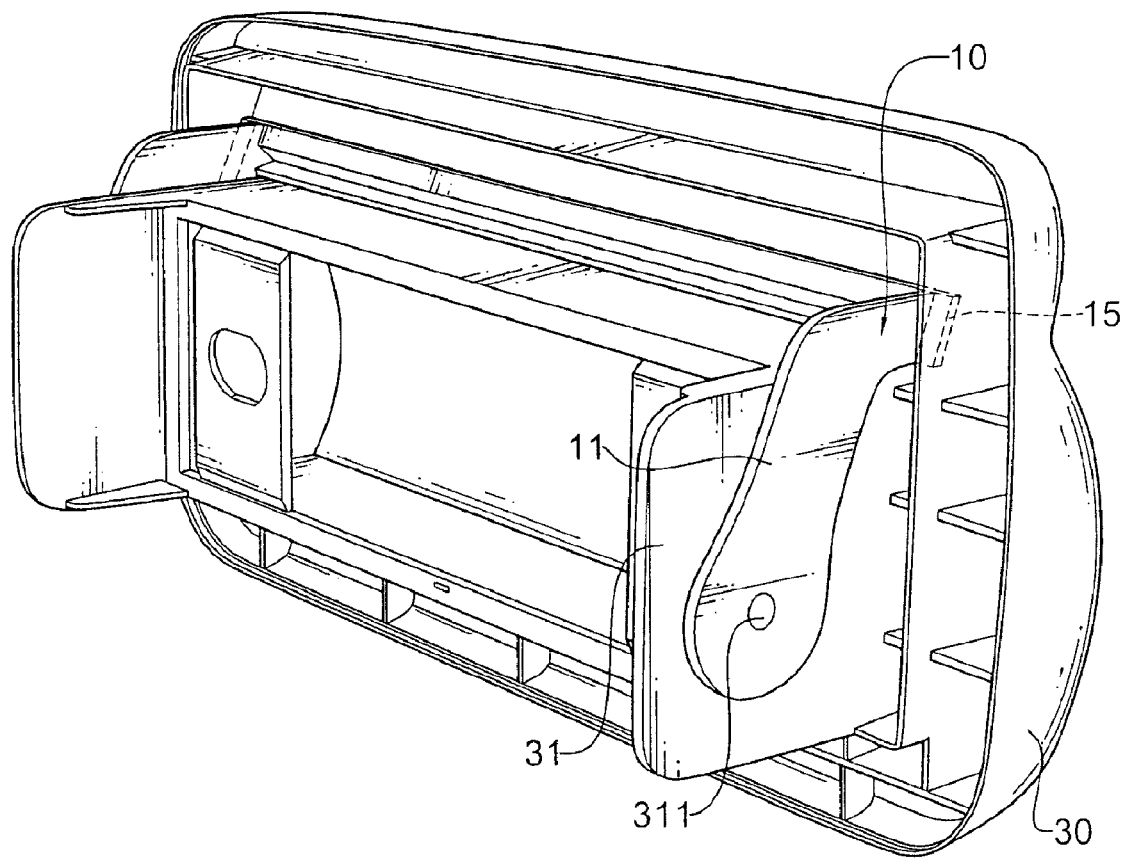
FIG. 3 is a perspective view showing the rear side of the waterproof cover of the present invention.

With reference to FIG. 3, it is noted that when the shield (10) is pivoted to close the through hole (not seen from this drawing), the two wings (15) are able to abut the two opposed sides of the top periphery adjacent to the through hole to prevent any water from seeping through the engagement between the shield (10) and the frame (30).

Figure 4:
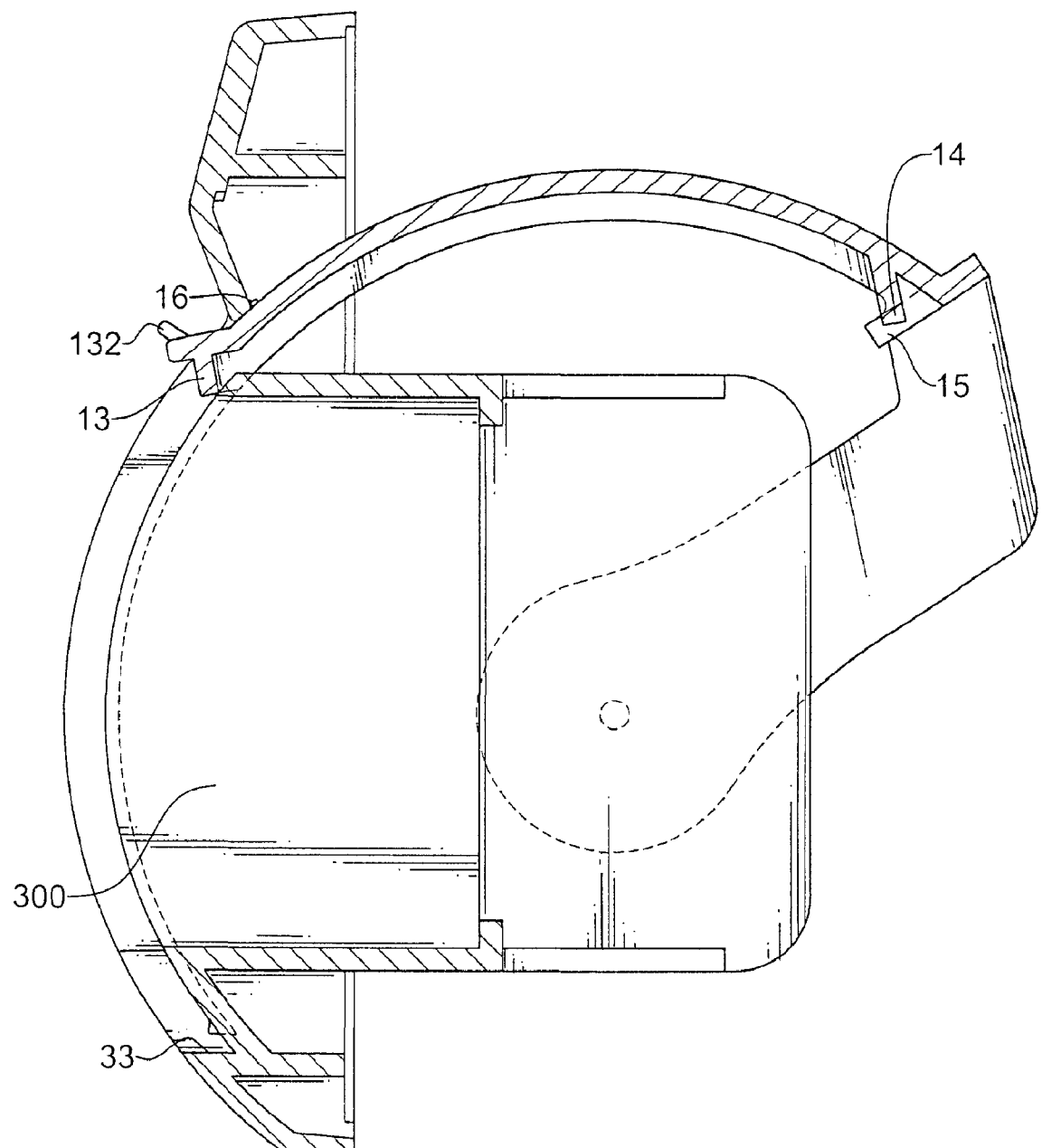
FIG. 4 is an operational view showing that the shield is pivoted to expose the through hole of the frame.
Figure 5:
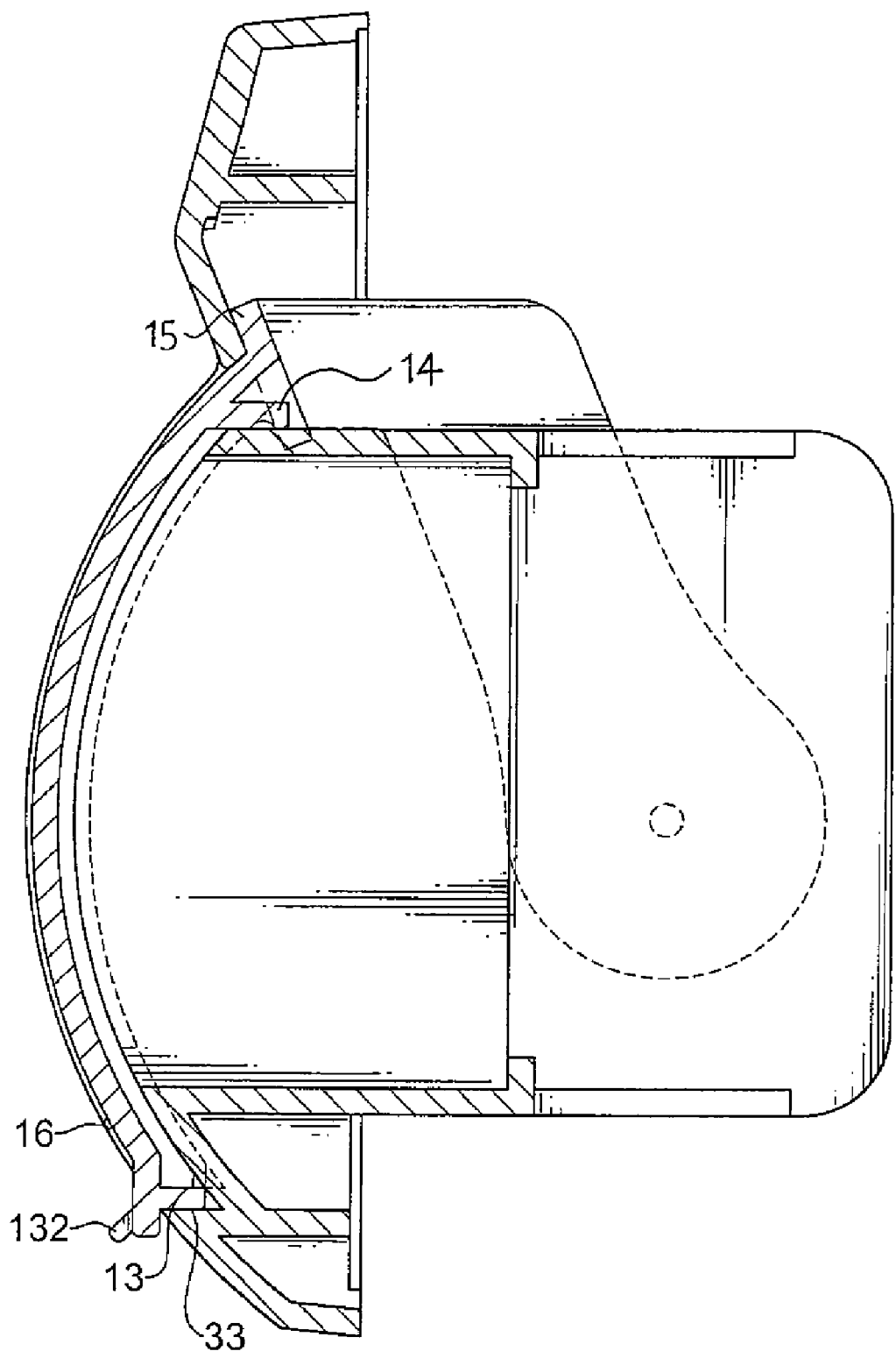
FIG. 5 is an operational view showing that the shield is pivoted to close the through hole of the frame.

With reference to FIGS. 4 and 5 and still using FIG. 1 for reference, it is noted that after the shield (10) is pivoted to open the through hole (300) of the frame (30), a boss (16) formed on an outer surface of the shield (10) is abutted against a rear side of the top periphery defining the through hole (300) so as to temporarily hold the shield (10) in position. When the shield (10) is about to pivot to close the through hole (300), the rails (12) move along the corresponding elongated recesses (32) and the water blocking flange (13) is eventually received in the corresponding inclined trough (33). Furthermore, a ledge (132) is formed on an outer surface of the shield (10) so that when the water blocking flange (13) is received in the corresponding inclined trough (33), the operator is able to hold the ledge (132) to pivot the shield (10) so as to reopen the through hole (300) of the frame (30).

It is concluded that the shield (10) is now provided with the rails (12) formed on two opposed sides of the shield (10), the water blocking flange (13) formed on the bottom face of the shield (10) and sandwiched by the two rails (12) and a flange (14) formed on the top face of the shield (10) to respectively abut side faces defining the through hole (300) of the frame (30). Especially, the two wings (15) formed on the opposed sides of the flange (14) are able to ensure that there is no water seeping through the sides of the frame (30). Therefore, with the special designed features of the shield (10) and the frame (30), the waterproof effect of the waterproof cover is able to meet the requirements.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A waterproof cover for an audio system, the waterproof cover including a frame and a shield pivotally connected to the frame so as to selectively close a through hole defined in the frame, wherein
    the frame has two elongated recesses respectively defined in two opposed sides adjacent to the through hole and an inclined trough sandwiched by the two elongated recesses and defined in a bottom side adjacent to the through hole;
    the shield has two rails formed on two opposed sides thereof to correspond to and be movably received in the two elongated recesses, a water blocking flange sandwiched by the two rails, formed on a rear surface of a bottom side of the shield and protruding backwards towards the frame to correspond to and be received in the inclined trough, and a flange formed on a rear surface of a top side of the shield, protruding backwards towards the frame to abut a top side of the frame adjacent to the through hole such that the through hole is completely covered by the shield and water seeping between the shield and the frame is prevented.

2. The waterproof cover as claimed in claim 1, wherein two wings are respectively formed on two opposed sides of the flange to abut two sides of the top side adjacent to the through hole of the frame.

3. The waterproof cover as claimed in claim 2, wherein the shield has at least one boss formed on an outer periphery thereof to abut a rear surface of the top side adjacent to the through hole of the frame when the shield is pivoted to open the through hole.

4. The waterproof cover as claimed in claim 3, wherein the shield further has an outer flange formed adjacent to the water blocking flange to abut the bottom side adjacent to the through hole of the frame.

5. The waterproof cover as claimed in claim 4, wherein the shield has a ledge formed on the outer periphery to help pivot the shield relative to the frame.

\* \* \* \* \*